United States Patent
Ganachari

(10) Patent No.: US 12,123,783 B2
(45) Date of Patent: Oct. 22, 2024

(54) THERMAL MANAGEMENT SYSTEM, METHOD, AND DEVICE FOR MONITORING HEALTH OF ELECTRONIC DEVICES

(71) Applicant: Mahantesh Ganachari, Bengaluru (IN)

(72) Inventor: Mahantesh Ganachari, Bengaluru (IN)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 17/482,930

(22) Filed: Sep. 23, 2021

(65) Prior Publication Data

US 2022/0011169 A1    Jan. 13, 2022

Related U.S. Application Data

(63) Continuation of application No. PCT/EP2019/057903, filed on Mar. 28, 2019.

(51) Int. Cl.
    *G01K 1/02*    (2021.01)
    *G01J 5/00*    (2022.01)
    (Continued)

(52) U.S. Cl.
    CPC ............. *G01K 1/026* (2013.01); *G01J 5/00* (2013.01); *G05B 15/02* (2013.01);
    (Continued)

(58) Field of Classification Search
    None
    See application file for complete search history.

(56) References Cited

U.S. PATENT DOCUMENTS

| 9,858,388 B1 | 1/2018 | Ashoori |
| 2005/0099163 A1* | 5/2005 | Liepold .................. G01K 17/06 |
| | | 374/E17.007 |

(Continued)

FOREIGN PATENT DOCUMENTS

| CN | 101877059 A | 11/2010 |
| CN | 102508074 A | 6/2012 |

(Continued)

OTHER PUBLICATIONS

International Preliminary Report on Patentability for International Patent Application PCT/EP2019/057903 dated Jul. 6, 2021.
(Continued)

*Primary Examiner* — David Earl Ogg
(74) *Attorney, Agent, or Firm* — Lempia Summerfield Katz LLC

(57) ABSTRACT

A thermal management device, a thermal management system, a method, and an electronic device are provided. The thermal management system has the thermal management device communicatively coupled with one or more electronic devices including a thermal sensing unit having a plurality of thermal sensors sensing thermal data associated with each of the electronic devices. The thermal management device is configured to obtain the thermal data associated with the electronic device, generate a thermal profile based on the thermal data, and determine an abnormal thermal associated with the electronic device based on the thermal profile and a reference thermal profile of the electronic device. The thermal management device is also configured to initiate a preventive action at the electronic device to address the abnormal thermal condition.

13 Claims, 6 Drawing Sheets

(51) Int. Cl.
    *G05B 15/02*     (2006.01)
    *G06Q 10/0635*     (2023.01)
    *G06Q 10/20*     (2023.01)
    *G07C 3/14*     (2006.01)

(52) U.S. Cl.
    CPC .. *G06Q 10/0635* (2013.01); *G01J 2005/0077* (2013.01); *G06Q 10/20* (2013.01); *G07C 3/14* (2013.01)

(56) References Cited

U.S. PATENT DOCUMENTS

| | | | |
|---|---|---|---|
| 2005/0114068 A1* | 5/2005 | Chey | G01K 1/026 374/E1.005 |
| 2008/0082304 A1 | 4/2008 | Miller | |
| 2014/0074433 A1* | 3/2014 | Crepet | G05B 23/0254 702/183 |
| 2014/0315592 A1* | 10/2014 | Schlub | H04W 52/367 455/522 |
| 2015/0378404 A1* | 12/2015 | Ogawa | G05B 15/02 700/300 |
| 2017/0160707 A1* | 6/2017 | Srinivasan | G06F 1/206 |
| 2017/0330044 A1 | 11/2017 | Telpaz | |
| 2017/0374296 A1 | 12/2017 | Schmidt | |
| 2018/0143081 A1 | 5/2018 | Van Endert | |
| 2019/0018722 A1* | 1/2019 | Ramanath | G06F 17/18 |
| 2019/0285689 A1 | 9/2019 | Degrenne et al. | |

FOREIGN PATENT DOCUMENTS

| | | |
|---|---|---|
| CN | 102789226 A | 11/2012 |
| CN | 107357194 A | 11/2017 |
| CN | 107547892 A | 1/2018 |
| CN | 107850877 A | 3/2018 |
| EP | 2708963 A1 | 3/2014 |
| EP | 3203250 A1 | 8/2017 |
| WO | 2014147691 A1 | 9/2014 |
| WO | 2015157370 A1 | 10/2015 |
| WO | 2018136414 A1 | 7/2018 |

OTHER PUBLICATIONS

International Search Report and the Written Opinion for International Patent Application PCT/EP2019/057903 dated Nov. 4, 2019.
Wang, L. "Research on health management system of electronic equipment." Electronics World 2 (2018): 68-69, with machine translation.

* cited by examiner

THERMAL MANAGEMENT SYSTEM, METHOD, AND DEVICE FOR MONITORING HEALTH OF ELECTRONIC DEVICES

The present patent document is a continuation of PCT Application Serial No. PCT/EP2019/057903, filed Mar. 28, 2019, designating the United States, which is hereby incorporated by reference.

TECHNICAL FIELD

The present disclosure relates to thermal management of electronic devices.

BACKGROUND

Industrial devices, (e.g., industrial automation devices), may be subjected to extreme conditions owing to the surrounding ambient temperature, poor ventilation, and/or dusty environment. One of the main reasons of failure of these devices involves operating the devices at extreme temperatures. Any industry may include these devices in large numbers because of which they are rarely ever opened and cleaned thereby, accumulating dust over time. Moreover, these devices may not be easily accessible for inspection due to their positioning. This leads to a gradual deterioration in their heat dissipation capacity and eventually failure of the devices.

As such devices are critical for the operation of an industry the failure of devices, (e.g., control devices), has a large impact on the maintenance costs as well as reliability of operations happening in the industry. However, a gradual increase in the operating temperature of the devices is inevitable. Failure to monitor and raise a flag at appropriate deviations in the operating conditions may lead to heavy costs and operational hindrances including safety issues.

Conventionally, a discrete electronic component used for building the electronic circuitry may be configured to perform at the rated voltage or current so that the heat produced by the component is within the limits. However, in a circuit where such discrete components are placed in tight proximity of one another, heat generated by neighboring components may affect the overall operation of the circuit. Furthermore, thermal failures of smaller components like resistors may go unnoticed in such circuits. The test scenarios that these circuits are put through may not be able to reproduce all the real-life scenarios associated with field conditions due to constraints on time invested in testing.

Conventional techniques used in addressing the aforementioned problems involve designing the circuitry for extreme temperature conditions by choosing the components having wide tolerances to temperatures, using highly available redundant control systems in which stand-by components take over in case primary components fail, thereby, minimizing the risk involved and/or use of heat sinks. However, this increases cost associated with the components. Moreover, the control systems employing such circuits become very slow as each of the components introduced for maintaining redundancy have to synchronize the process acts involved in the operation of the component which when failed is to be replaced by the redundant component. Other conventional techniques used in addressing the aforementioned problems involve elimination of cooling fans in the circuits to avoid influx of ambient air into the circuit and as a result surrounding dust and dirt entering into the circuit. However, this may increase risks of thermal runaway due to absence of proper ventilation. The conventional techniques further involve use inbuilt processors that detect rise in temperature and take appropriate actions to curb the temperature rise. However, these processors do not cover entire set of active and passive components in the circuits. Moreover, this technique involves use of sensors such as infra-red sensors that are embedded onto the circuits which feed temperature data from certain zones of the circuit to a thermal monitoring unit which either extrapolates the data to a possible thermal breakdown threshold or interpolates the values of temperatures of these zones as well as neighboring zones to form a continuous temperature map. However, the extrapolation and/or interpolation techniques do not offer a reliable solution due to lack of real-time data.

SUMMARY AND DESCRIPTION

Therefore, it is an object of the present disclosure to provide a system, a method, a thermal management device, and an electronic device that generates thermal profiles of the electronic device to minimize risk of failure of the electronic device while providing reliability and cost-efficiency.

The present disclosure achieves the aforementioned object by employing a thermal management device, a thermal management system, a method, and an electronic device for managing thermal data associated the electronic device.

The scope of the present disclosure is defined solely by the appended claims and is not affected to any degree by the statements within this summary. The present embodiments may obviate one or more of the drawbacks or limitations in the related art.

According to the present disclosure, a thermal management system including one or more electronic devices and a thermal management device communicatively couplable with the electronic devices is provided.

According to one aspect of the present disclosure, the thermal management system is a technical installation, for example, an industrial automation environment including electronic devices installed in large numbers and difficult to access.

The electronic device disclosed herein includes an integrated circuitry and a thermal sensing unit configured to sense thermal data associated with the electronic device. The integrated circuitry includes a plurality of components, active and passive, for example, microcontrollers, microprocessors, transformers, transistors, resistors, capacitors, inductors, gates, etc.

According to one aspect of the present disclosure, the integrated circuitry is installed on a multi-layer printed circuit board (PCB).

According to another aspect of the present disclosure, the integrated circuitry is installed on a single layer printed circuit board (PCB).

The thermal sensing unit includes multiple thermal sensors operably connected with the integrated circuitry. As used herein, "thermal sensing unit" refers to an array of thermal sensors deployable in the electronic device to sense thermal data. The thermal data includes, for example, temperature sensed at a particular location on the PCB, a time instant at which the temperature is sensed, a spatial location on the PCB at which the temperature is sensed, the electronic device for which the temperature is sensed, etc. The thermal sensors include, but are not limited to, negative temperature coefficient sensors, resistance temperature detection sensors, thermocouple sensors, and semiconductor-based sensors.

According to one aspect of the present disclosure, the thermal sensing unit is configured as one of the layers of a multi-layer PCB, that is, the electronic device. In this aspect, the thermal sensing unit includes a grid, the density of which is configured based on the integrated circuitry of the electronic device. In this aspect, each finite element of the grid contains four thermal sensors installed therein.

According to another aspect of the present disclosure, the thermal sensing unit is configured as a mountable installation on a single-layer PCB, that is the electronic device. In this aspect, the thermal sensors include a mini/micro thermal imaging sensor installed on the single-layer PCB not in form of a layer but as an external component installed within the packaged electronic device.

The thermal sensors selectively sense the thermal data associated with the integrated circuitry of the electronic device, via the thermal management device. Each of the thermal sensors is individually addressable by the thermal management device via a communication interface of the electronic device. Each of the thermal sensors is operable in three states including, for example, an open state, a closed state, and a sense state. In the open state, the thermal sensor offers a high impedance, however, is transparent to the communication signals being received from the thermal management device, that is, the thermal sensor is in an off state. In the closed state, the thermal sensor acts merely as a conductor or a load connected to the electronic device without sensing thermal data. In the sense state, the thermal sensor, is activated and starts sensing the thermal data.

According to one aspect of the present disclosure, the sense state includes selective sensing of integrated circuitry via a selected set of the thermal sensors associated with the integrated circuitry.

According to another aspect of the present disclosure, the sense state includes selective control of the resolution, that is, a granularity of the thermal data being sensed, via selective activation of thermal sensors across the grid.

According to another aspect of the present disclosure, the thermal sensing unit of the electronic device, includes a multiplexing unit such as a customized application specific integrated circuit (ASIC) configured to converge connection terminals of each of the grid elements across the length and the breadth of the grid. The multiplexing unit is connected to the communication interface, for example, using the data distribution service (DDS) communication protocol. The thermal sensing unit of the electronic device communicates with the thermal management device via the communication interface for transfer of the thermal data and receipt of instructions for selective activation of the thermal sensing unit.

The thermal management device disclosed herein, includes a non-transitory computer readable storage medium storing one or more modules including computer program instructions, and at least one processor communicatively coupled to the non-transitory computer readable storage medium, and executing the computer program instructions, is provided. As used herein, "non-transitory computer readable storage medium" refers to all computer readable media, for example, non-volatile media, volatile media, and transmission media except for a transitory, propagating signal.

According to one aspect of the present disclosure, the thermal management device is an edge device deployable in an Internet of Things (IoT) computing environment. For example, the thermal management device is deployable in an industrial environment where it communicates with one or more electronic devices installed therein via a private wired or wireless communication network such as a private cloud.

According to another aspect of the present disclosure, the thermal management device is a cloud device deployable in a cloud computing environment. For example, the thermal management device is deployable in an industrial environment where it communicates with one or more electronic devices via cloud. As used herein, "cloud computing environment" refers to a processing environment including configurable computing physical and logical resources, (e.g., servers, storage, applications, services, etc.), and data distributed over the network. The cloud computing environment provides on-demand network access to a shared pool of the configurable computing physical and logical resources.

The modules of the thermal management device include a thermal data management module, a thermal profile generation module, a thermal data analysis module, and a thermal condition module. The thermal management device also includes a thermal management database and a graphical user interface (GUI). The modules are according to one aspect of the present disclosure are downloadable and usable on a user device, (e.g., the thermal management device), are configured as a web-based platform, (e.g., a website hosted on a server or a network of servers), or are implemented in the cloud computing environment as a cloud computing-based platform implemented as a service for managing thermal data. The modules are developed, for example, using Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

The thermal data management module obtains thermal data associated with the electronic device communicatively couplable with the thermal management device, wherein the electronic device includes at least one thermal sensing unit, and wherein the thermal sensing unit is configured to sense the thermal data associated with the electronic device. The thermal data management module activates the thermal sensing unit in the electronic device for selectively obtaining the thermal data.

According to one aspect of the present disclosure, the thermal data management module via the GUI, receives user preferences, for example, from an operator of the thermal management device. The user preferences include, but are not limited to, a desired electronic device for which thermal data is to be obtained, a desired resolution of thermal data acquisition, a desired frequency of thermal data acquisition, a desired integrated circuitry of the electronic device for thermal data acquisition, etc. The thermal data management module based on the user preferences received, activates operational states of the electronic devices for sensing the thermal data. The operational states involve activating a sense state, an open state, and/or a close state; controlling a resolution, a frequency, an area, etc., of the thermal sensing unit; and selective sensing of the thermal data.

According to another aspect of the present disclosure, the thermal data management module stores the user preferences and periodically activates the thermal sensing units within the electronic devices for obtaining the thermal data.

According to yet another aspect of the present disclosure, the thermal data management module selectively activates the thermal sensing units based on ambient conditions, for example, ambient temperature, ambient dust, etc.

According to yet another aspect of the present disclosure, the thermal data management module selectively activates the thermal sensing units based on a usage of the electronic device including usage for a particular application, a life of the electronic device, etc.

The thermal profile generation module generates a thermal profile based on the thermal data obtained by the thermal data management module. As used herein, "thermal profile" refers to a temperature contour of the electronic device, that is, the electronic device being monitored for thermal data management.

According to one aspect of the present disclosure, the thermal profile includes at least one of a temporal profile and a spatial profile of the thermal data associated with the electronic device. As used herein, "temporal profile" refers to temperature contours recorded over a period of time for a particular integrated circuitry and/or a particular electronic device. As used herein, "spatial profile" refers to temperature contours recorded over an area of interest of the integrated circuitry and/or the electronic device.

According to another aspect of the present disclosure, the thermal profile includes an aggregated profile of the thermal data associated with an integrated circuitry of one or more electronic devices. As used herein, "aggregated profile" refers to temperature contours recorded for a particular integrated circuitry across electronic devices and/or a particular type of electronic device, for example, all programmable logic controllers (PLCs) deployed in an industrial setup.

The thermal profile generation module stores the thermal profiles generated in the thermal management database for future references.

The thermal data analysis module determines an abnormal thermal condition associated with the electronic device based on the thermal profile. As used herein, "abnormal thermal condition" refers to a deviation in the thermal profile generated with respect to a reference thermal profile associated therewith. The deviation may be with respect to density of temperature contours and/or a rate of change of the temperature contours with respect to the reference thermal profile. The thermal data analysis module obtains the reference thermal profile stored in the thermal management database based on the thermal profile generated. According to one aspect of the present disclosure, the thermal data analysis module, in communication with the thermal profile generation module, constructs a reference thermal profile by combining the available reference thermal profiles for a user preference received for the first instant and not having an associated reference thermal profile stored in the thermal management database. For example, if the user preference is to have a temporal thermal profile generated for a particular integrated circuitry over a period of two months, then the thermal data management module and the thermal profile generation module construct a reference temporal profile either by using thermal data stored for the integrated circuitry of interest for a period of two months when the electronic device was functioning as expected, or by extrapolating the thermal data available when the electronic device was functioning as expected.

The thermal data analysis module obtains a reference thermal profile associated with one or more electronic devices and compares the thermal profile and the reference thermal profile. Based on the comparison, the thermal data analysis module determines the abnormal thermal condition using a pre-defined deviation threshold of each of the electronic devices. That is, the deviation observed is compared with the pre-defined deviation threshold to check whether it is in an acceptable limit or not. If yes, the deviation is not treated as abnormal thermal condition. If not, the deviation is treated as an abnormal thermal condition and recorded in the thermal management database.

According to one aspect of the present disclosure, the thermal data analysis module analyzes the abnormal thermal condition based on one or more performance parameters. The performance parameters include, for example, the pre-defined deviation threshold of each of the electronic devices, a rate of occurrence of a deviation in the thermal profile, and one or more properties of an integrated circuitry of each of the electronic devices with which the abnormal thermal condition is associated. For example, the deviation observed is beyond the pre-defined deviation threshold, the deviation is increasing at a rate beyond acceptable rate, and/or the deviation is for an integrated circuitry crucial for operation of the electronic device. The thermal data analysis module determines a risk index based on the analysis of the abnormal thermal condition. The risk index includes a high risk, a medium risk, and a low risk. According to one aspect of the present disclosure, a confirmation from the user is sought on the risk index determined. The determined risk index is stored in the thermal data management module.

The thermal conditioning module determines a preventive action to be performed on at least one electronic device, such that the abnormal thermal condition is addressed, and initiates the preventive action at the at least one electronic device. The preventive action includes, but is not limited to, invoking a cleaning routine of the electronic device, replacing an integrated circuitry of the electronic device, generating an alarm or a notification on the GUI of the thermal management device and/or a GUI, if existing, on the electronic device regarding abnormal thermal condition, generating an indication associated with health of the electronic device over a period of time on the GUI of the thermal management device, etc. According to one aspect of the present disclosure, the thermal conditioning module determines the preventive action based on a user input received for corresponding abnormal thermal condition. According to another aspect of the present disclosure, the thermal conditioning module determines the preventive action based on historical data stored in the thermal management database. The thermal management database stores the thermal data, the abnormal thermal condition, the risk index, and a preventive action to be taken for the same in form of a look-up table such as shown in table below.

| Sr No. | Electronic Device | Integrated circuitry | Operational Criticality index | Reference thermal profile | Abnormal thermal condition(s) observed | Risk Index | Preventive action(s) taken |
| --- | --- | --- | --- | --- | --- | --- | --- |
| 1 | PLC1 | IC1.0 | High | RFPLC1 | Dev_Ovrll | H | Clean |
|  |  | IC1.1 | high | RFIC1.0 | Dev_Temp | M | Replc |
|  |  | IC1.2 | low | RFIC1.1 | Dev_Spat | M | Replc |
|  |  | Txmr 1 | high | RFIC1.2 | Dev_agg | L | Notif |

-continued

| Sr No. | Electronic Device | Integrated circuitry | Operational Criticality index | Reference thermal profile | Abnormal thermal condition(s) observed | Risk Index | Preventive action(s) taken |
|---|---|---|---|---|---|---|---|
| | | Cap 1 | low | RFTxmr1<br>RFCap1 | Dev_Ovrll<br>Dev_Ovrll | M<br>L | Replc<br>Notif |

Also disclosed herein is a method for managing thermal data associated with one or more aforementioned electronic devices. The method employs aforementioned thermal management device communicatively couplable with the electronic devices. The method obtains thermal data associated with an electronic device, generates a thermal profile based on the thermal data, and determines an abnormal thermal condition associated with the electronic device based on the thermal profile. The method obtains the thermal data by selectively activating a thermal sensing unit in the electronic device for sensing the thermal data. The method generates the thermal profiles based on user input and/or preset user preferences, (e.g., temporal profiles, spatial profiles, aggregated profiles, etc.). The method determines the abnormal thermal condition by obtaining a reference thermal profile associated with one or more electronic devices, (e.g., from the thermal management database), comparing the thermal profile and the reference thermal profile, and determining the abnormal thermal condition based on the comparison of the thermal profile and the reference thermal profile using a pre-defined deviation threshold of each of the electronic devices.

According to another aspect of the present disclosure, the method analyzes the abnormal thermal condition based on one or more performance parameters, including, for example, a pre-defined deviation threshold of each of the electronic devices, a rate of occurrence of a deviation in the thermal profile, one or more properties of an integrated circuitry of each of the electronic devices with which the abnormal thermal condition is associated, etc., and determining a risk index based on the analysis of the abnormal thermal condition.

According to yet another aspect of the present disclosure, the method determines a preventive action to be performed on at least one electronic device, such that the abnormal thermal condition is addressed, and initiates the preventive action at the at least one electronic device.

According to yet another aspect of the present disclosure, the method includes storing each thermal profile generated along with the abnormal thermal condition determined in the thermal management database. Electronic hardware designers may design integrated circuitry referring to the specified behavior of the components involved by referring to their data sheets. Once a design is complete and placement of the component is complete, the designers need to study, simulate, and analyze the behavior of the built device. There are chances of the design failing due to various factors like influence of neighboring components as a result of heat dissipation, operating frequencies, electromagnetic radiation, etc. These behaviors may be anticipated to some degree but are not full proof as a behavior may appear when the built device is being used in the field. Thus, storing the data pertaining to abnormal thermal conditions and the thermal profiles helps the designers, to understand the behavior of the associated integrated circuitry under the prevailing conditions and to modify the subsequent versions of their designs.

The thermal management device, system, method, and electronic device disclosed herein provide for a quality oriented proactive management of thermal data of each critical control device in an industry while enabling building of knowledgebase of field data over time for improved and enhanced future actions associated with thermal data management. Moreover, there is no dependence on manufacturer provided reliable thermal profiles as behavior of the various electronic devices and their integrated circuitry working together is predicted and constructed by selectively capturing the thermal data associated therewith. Furthermore, the processing load of the thermal management device is optimized by detection of abnormalities and determination of corresponding preventive actions based on severity of the underlying problem.

The above-mentioned and other features of the disclosure will now be addressed with reference to the accompanying drawings of the present disclosure. The illustrated embodiments are intended to illustrate, but not limit the disclosure.

BRIEF DESCRIPTION OF THE DRAWINGS

The present disclosure is further described hereinafter with reference to illustrated embodiments shown in the accompanying drawings, in which.

DETAILED DESCRIPTION

Figure 1:
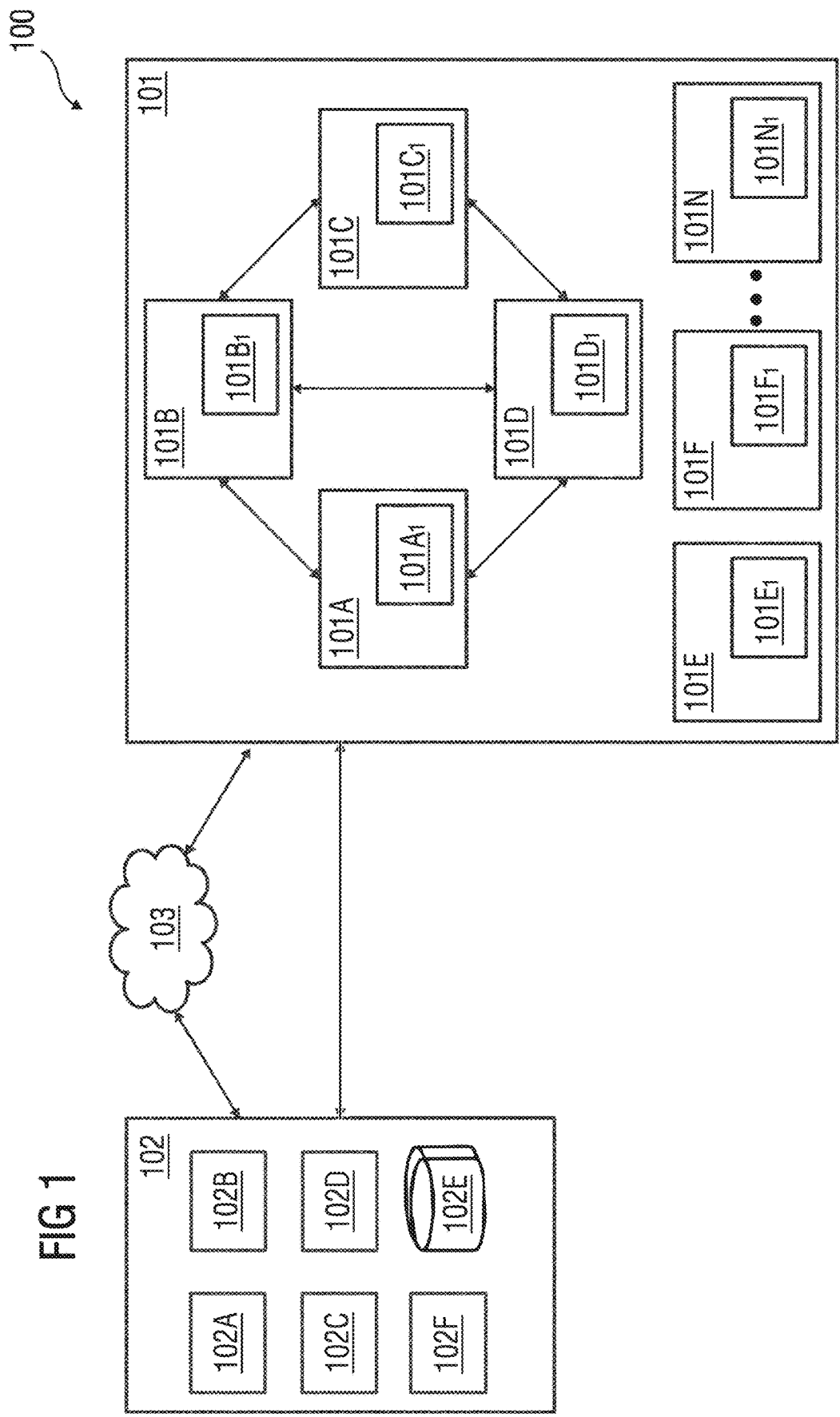
FIG. 1 illustrates an example of a thermal management system including a thermal management device communicatively coupled with electronic devices via a communication network, for managing thermal data associated with electronic devices.

Various embodiments are described with reference to the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 illustrates a thermal management system 100 including a thermal management device 102 communicatively coupled with electronic devices 101A-101N via a wired or a wireless communication network 103 such as a cloud, for managing thermal data associated with electronic devices 101A-101N. The electronic devices 101A-101N are installed in a technical installation 101, for example, remote field sensors installed in an industrial environment. These electronic devices 101A-101N have connections there-between or are individual entities without any connections there-between. Each of the electronic devices 101A-101N have an integrated circuitry and a thermal sensing unit $101A_1$-$101N_1$ configured to sense thermal data associated with respective electronic device 101A-101N. The electronic devices 101A-101N also have a communication interface (not shown) transmitting and receiving data between the thermal sensing unit $101A_1$-$101N_1$ and the thermal management device 102.

The thermal management device 102 includes a non-transitory computer readable storage medium configured to store one or more modules including computer program instructions and at least one processor communicatively coupled to the non-transitory computer readable storage medium. The at least one processor executes the computer program instructions. The modules include a thermal data management module 102A, a thermal profile generation module 102B, a thermal data analysis module 102C, and a thermal conditioning module 102D. The thermal management device 102 also has a thermal management database 102E and a graphical user interface (GUI) 102F. The thermal data management module 102A obtains thermal data associated with the electronic devices 101A-101N communicatively couplable with the thermal management device 102. The thermal data management module 102A activates the thermal sensing unit $101A_1$-$101N_1$ in the electronic device 101A-101N for selectively obtaining the thermal data. The thermal profile generation module 102B generates a thermal profile 203 based on the thermal data. The thermal data analysis module 102C determines an abnormal thermal condition associated with the electronic device 101A-101N based on the thermal profile. The thermal data analysis module 102C obtains a reference thermal profile associated with one or more of the electronic devices 101A-101N from the thermal management database 102E, compares the thermal profile with the reference thermal profile, and determines the abnormal thermal condition based on the comparison using a pre-defined deviation threshold for each electronic device 101A-101N. The thermal data analysis module 102C analyzes the abnormal thermal condition based on one or more performance parameters and determines a risk index based on the analysis of the abnormal thermal condition. The performance parameters include a pre-defined deviation threshold of each of the electronic devices 101A-101N, a rate of occurrence of a deviation in the thermal profile, and the integrated circuitry of each of the electronic devices 101A-101N with which the abnormal thermal condition is associated. The thermal conditioning module 102D determines a preventive action to be performed on at least one electronic device 101A-101N, such that the abnormal thermal condition is addressed and initiates the preventive action at the at least one electronic device 101A-101N.

Figure 2A:
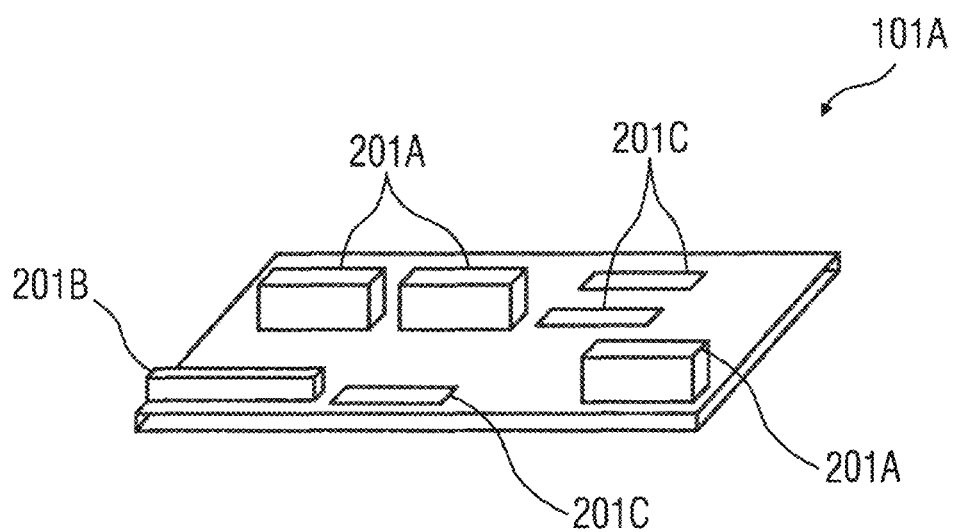
FIGS. 2A-2B illustrate an example of an electronic device having a thermal sensing unit integrated therein.
Figure 2B:
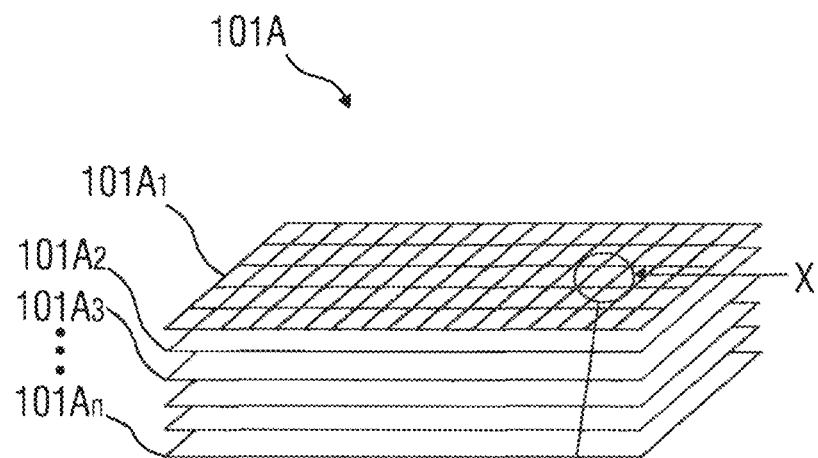

FIGS. 2A-2B illustrate an electronic device 101A having a thermal sensing unit $101A_1$ integrated therein. FIG. 2A shows the electronic device 101A having integrated circuitry 201A-201C. The integrated circuitry 201A-201C represents active and/or passive components such as chips, processors, controllers, transistors, resistors, capacitors, transformers, heat sinks, etc. embedded into the electronic device 101A. FIG. 2B illustrates a multi-layer printed circuit board (PCB) having layers $101A_1$-$101A_n$ on which the integrated circuitry 201A-201C of the electronic device 101A is embedded. The thermal sensing unit $101A_1$ is configured as one of the layers $101A_1$-$101A_n$ of the multi-layer PCB. The thermal sensing unit $101A_1$ is configured to sense thermal data associated with the electronic device 101A via instructions initiated from the thermal data management module 102A of the thermal management device 102.

Figure 2C:
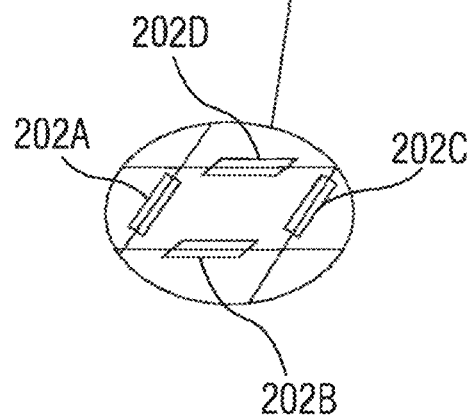
FIG. 2C illustrates an enlarged view of a portion of the thermal sensing unit, marked "A" in FIG. 2B showing thermal sensors for sensing thermal data.

FIG. 2C illustrates an enlarged view of a portion of the thermal sensing unit $101A_1$, marked "X" in FIG. 2B showing thermal sensors 202A, 202B, 202C, and 202D for sensing thermal data. The thermal sensors 202A, 202B, 202C, and 202D are positioned in a grid shape across the thermal sensing unit $101A_1$ to provide comprehensive sensing of the thermal data. The thermal sensors, for example, 202A and 202C, lying along breadth of the sensing unit $101A_1$ are connected to a vertical multiplexing unit (not shown). Similarly, the thermal sensors, for example, 202B and 202D, lying along length of the sensing unit $101A_1$ are connected to a horizontal multiplexing unit (not shown). The multiplexing facilitates a single point of transfer of thermal data from the electronic device 101A to the thermal management device 102 shown in FIG. 1.

Figure 2D:
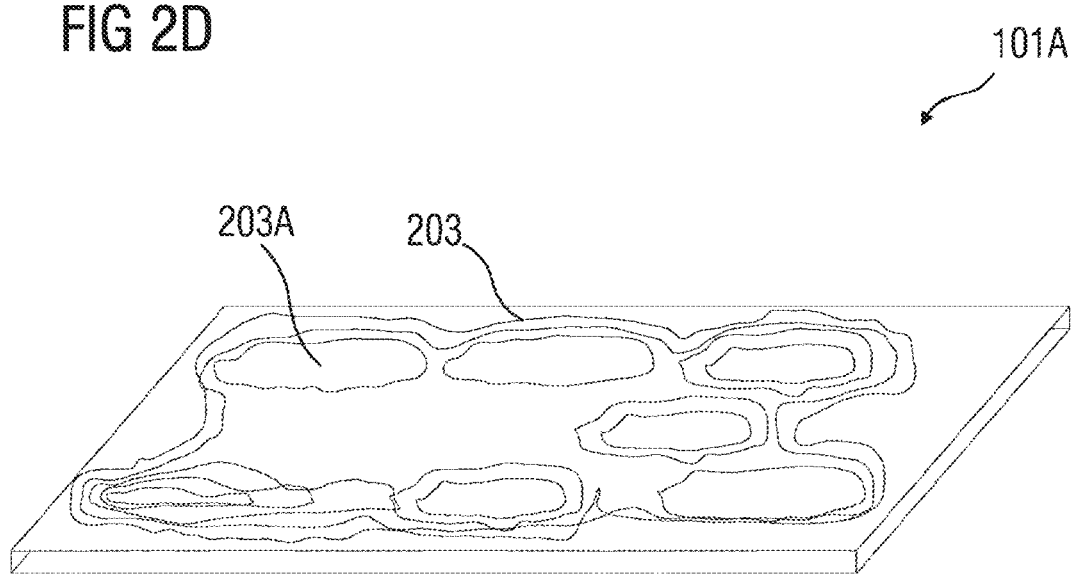
FIGS. 2D-2E illustrate thermal profiles of the electronic device illustrated in FIGS. 2A-2B.
Figure 2E:
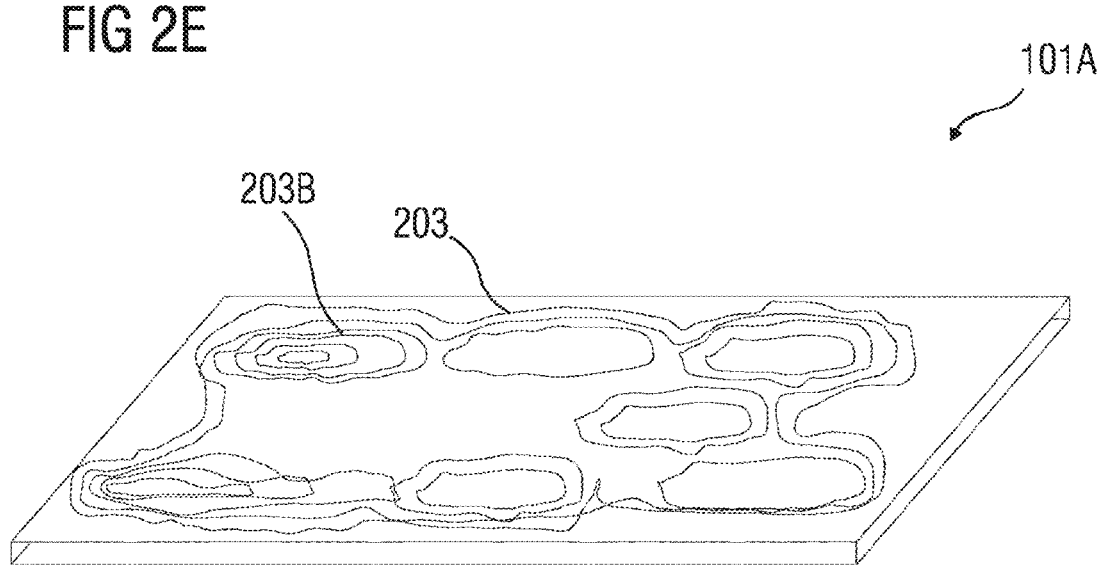

FIGS. 2D-2E illustrate thermal profiles 203 of the electronic device 101A illustrated in FIGS. 2A-2B. FIG. 2D illustrates a thermal profile 203 generated at an operational time instant T1 of the electronic device 101A. This thermal profile 203 matches a reference thermal profile of the electronic device 101A. FIG. 2E illustrates the thermal profile 203 generated at an operational time instant T2 of the electronic device 101A, which when compared to the reference thermal profile. That is, the thermal profile 203 shown in FIG. 2D, is deviant in an area 203B of the thermal profile 203 as compared with an area 203A shown in FIG. 2D. This deviation being higher than a pre-defined deviation threshold of the electronic device 101A, is considered by the thermal management device 102 to be an abnormal thermal condition 203B. Based on the criticality of the integrated circuitry 201A shown in FIG. 2A, a risk index of high, medium, or low is assigned to the abnormal thermal condition by the thermal management device 102 and an appropriate preventive action is initiated at the electronic device 101A to prevent damage due to the abnormal thermal condition 203B.

Figure 3:
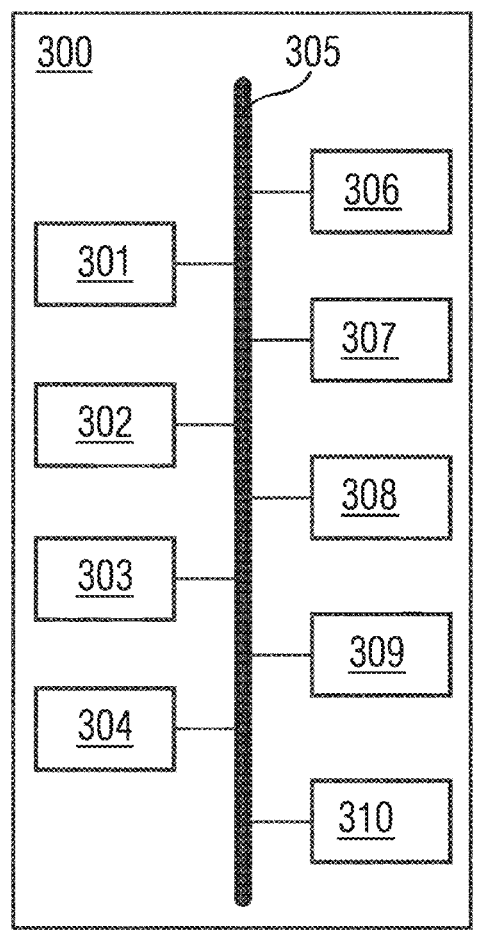
FIG. 3 is a block diagram illustrating an example of architecture of a computer system employed by the thermal management device illustrated in FIG. 1, for managing thermal data associated with electronic devices.

FIG. 3 is a block diagram illustrating architecture of a computer system 300, employed by the thermal management device 102 illustrated in FIG. 1, for managing thermal data associated with electronic devices 101A-101N. The thermal management device 102 employs the architecture of the computer system 300. The computer system 300 is programmable using a high level computer programming language. The computer system 300 may be implemented using programmed and purposeful hardware. As illustrated in FIG. 3, the computer system 300 includes a processor 301, a non-transitory computer readable storage medium such as a memory unit 302 for storing programs and data, an input/output (I/O) controller 303, a network interface 304, a data bus 305, a display unit 306, input devices 307, a fixed media drive 308 such as a hard drive, a removable media drive 309 for receiving removable media, output devices 310, etc. The processor 301 refers to any one of microprocessors, central processing unit (CPU) devices, finite state machines, microcontrollers, digital signal processors, an application specific integrated circuit (ASIC), a field-programmable gate array (FPGA), etc., or any combination thereof, capable of executing computer programs or a series of commands, instructions, or state transitions. The processor 301 may also be implemented as a processor set including, for example, a general purpose microprocessor and a math or graphics co-processor. The processor 301 is selected, for example, from the Intel® processors, Advanced Micro Devices (AMD®) processors, International Business Machines (IBM®) processors, etc. The thermal management device 102 disclosed herein is not limited to a computer system 300 employing a processor 301. The computer system 300 may also employ a controller or a microcontroller. The processor 301 executes the modules, for example, 202A, 202B, and 202C of the thermal management device 102.

The memory unit 302 is used for storing programs, applications, and data. For example, the data communication module 202A, the data processing module 202B, and the data learning module 202C of the thermal management device 102 are stored in the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further includes a read only memory (ROM) or another type of static storage device that stores static information and instructions for the processor 301. The I/O controller 303 controls input actions and output actions performed by the thermal management device 102.

The network interface 304 enables connection of the computer system 300 to the communication network 103. For example, the thermal management device 102 connects to the communication network 103 via the network interface 304. In an embodiment, the network interface 304 is provided as an interface card also referred to as a line card. The network interface 304 includes, for example, interfaces using serial protocols, interfaces using parallel protocols, and Ethernet communication interfaces, interfaces based on wireless communications technology such as satellite technology, radio frequency (RF) technology, near field communication, etc. The data bus 305 permits communications between the modules, for example, 102A, 102B, 102C, and 102D of thermal management device 102.

The display unit 306, via a graphical user interface (GUI) 102F of the thermal management device 102, displays information such as a the thermal data sensed by the thermal sensing units $101A_1$-$101N_1$ of the electronic devices 101A-101N, resolution with which the thermal data is sensed, details of the electronic devices 101A-101N for which the thermal data is sensed, thermal profiles 203 generated for the electronic devices 101A-101N, abnormal thermal conditions 203B, if any, etc., via user interface elements such as text fields, buttons, windows, etc. The display unit 306 includes, for example, a liquid crystal display, a plasma display, an organic light emitting diode (OLED) based display, etc. The input devices 307 are used for inputting data into the computer system 300. The input devices 307 are, for example, a keyboard such as an alphanumeric keyboard, a touch sensitive display device, and/or any device capable of sensing a tactile input that could be used by the staff responsible for installing, commissioning, and/or maintenance of the electronic devices 101A-101N.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via the communication network 103. Computer applications and programs are executed by double clicking a related icon displayed on the display unit 306 using one of the input devices 307. The output devices 310 output the results of operations performed by the thermal management device 102. For example, the thermal management device 102 provides graphical representation of a risk index and/or a preventive action determined at one or more electronic devices 101A-101N, using the output devices 310. In another example, the thermal management device 102 may provide an alarm indication and/or a notification based on abnormal thermal condition 203B determined at one or more of the electronic devices 101A-101N, using the output devices 310.

The processor 301 executes an operating system, for example, the Linux® operating system, the Unix® operating system, any version of the Microsoft® Windows® operating system, the Mac OS of Apple Inc., the IBM® OS/2, etc. The computer system 300 employs the operating system for performing multiple tasks. The operating system is responsible for management and coordination of activities and sharing of resources of the computer system 300. The operating system further manages security of the computer system 300, peripheral devices connected to the computer system 300, and network connections. The operating system employed on the computer system 300 recognizes, for example, inputs provided by the users using one of the input devices 307, the output display, files, and directories stored locally on the fixed media drive 308. The operating system on the computer system 300 executes different programs using the processor 301. The processor 301 and the operating system together define a computer platform for which application programs in high level programming languages are written.

The processor 301 of the computer system 300 employed by the thermal management device 102 retrieves instructions defined by the thermal data management module 102A, the thermal profile generation module 102B, the thermal data analysis module 102C, the thermal conditioning module 102D, etc., of the thermal management device 102 for performing respective functions disclosed in the detailed description of FIG. 1. The processor 301 retrieves instructions for executing the modules, for example, 102A, 102B, 102C, 102D, etc., of the thermal management device 102 from the memory unit 302. A program counter determines the location of the instructions in the memory unit 302. The program counter stores a number that identifies the current position in the program of each of the modules, for example, 102A, 102B, 102C, 102D, etc., of the thermal management device 102. The instructions fetched by the processor 301 from the memory unit 302 after being processed are decoded. The instructions are stored in an instruction register in the processor 301. After processing and decoding, the processor 301 executes the instructions, thereby performing one or more processes defined by those instructions.

At the time of execution, the instructions stored in the instruction register are examined to determine the operations to be performed. The processor 301 then performs the specified operations. The operations include arithmetic operations and logic operations. The operating system performs multiple routines for performing a number of tasks required to assign the input devices 307, the output devices 310, and memory for execution of the modules, for example, 102A, 102B, 102C, 102D, etc., of the thermal management device 102. The tasks performed by the operating system include, for example, assigning memory to the modules, for example, 102A, 102B, 102C, 102D, etc., of the thermal management device 102, and to data used by the thermal management device 102, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 102A, 102B, 102C, 102D, etc., of the thermal management device 102 are displayed to the user on the GUI 102F.

For purposes of illustration, the detailed description refers to the thermal management device 102 being run locally on the computer system 300; however the scope of the present disclosure is not limited to the thermal management device 102 being run locally on the computer system 300 via the operating system and the processor 301, but may be extended to run remotely over the communication network 103 by employing a web browser and a remote server, a handheld device, or other electronic devices. One or more portions of the computer system 300 may be distributed across one or more computer systems (not shown) coupled to the communication network 103.

Disclosed herein is also a computer program product including a non-transitory computer readable storage medium that stores one or more computer program codes including instructions executable by at least one processor 301 for managing thermal data associated with one or more electronic devices 101A-101N, as disclosed in the present disclosure. The computer program product includes computer program codes for performing respective functions of the modules 102A, 102B, 102C, 102D, etc., as disclosed in the detailed description of FIG. 1. The computer program codes including computer executable instructions are embodied on the non-transitory computer readable storage medium. The processor 301 of the computer system 300 retrieves these computer executable instructions and executes them. When the computer executable instructions are executed by the processor 301, the computer executable instructions cause the processor 301 to perform the functions of the modules 102A, 102B, 102C, 102D, etc., as disclosed in the detailed description of FIG. 1.

Figure 4:
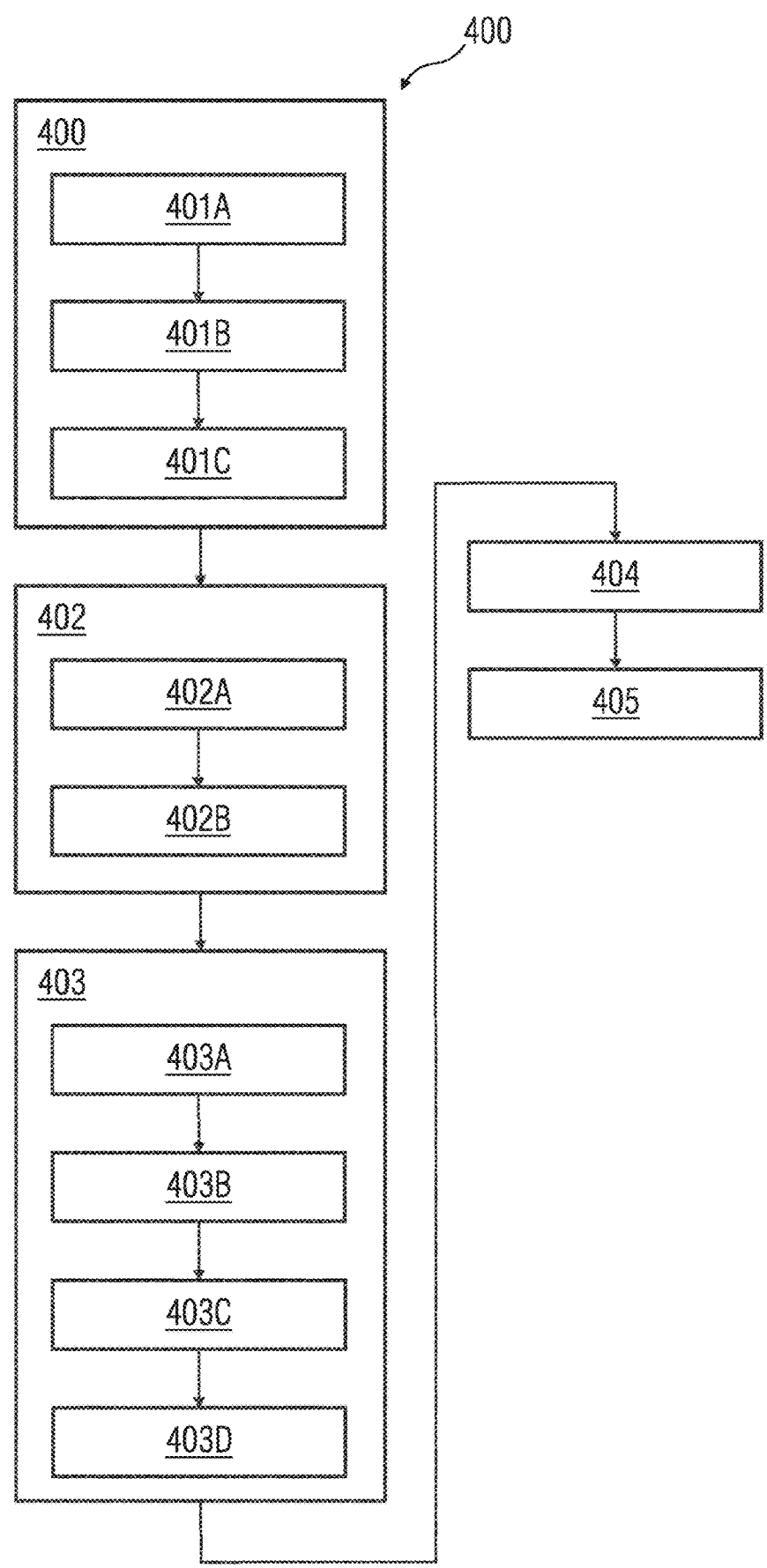
FIG. 4 illustrates a process flowchart of an exemplary method for managing thermal data associated with one or more electronic devices.

FIG. 4 illustrates a process flowchart 400 of an exemplary method for managing thermal data associated with one or more electronic devices 101A-101N. At act 401, the method obtains thermal data associated with one or more of the electronic devices 101A-101N shown in FIG. 1. To obtain the thermal data, the method, at act 401A, receives one or more user preferences, for example, from an operator of the thermal management device 102. The user preferences include, a desired resolution of thermal data acquisition, a desired frequency of thermal data acquisition, a desired electronic device 101A-101N for thermal data acquisition, a desired integrated circuitry 201A, 201B, 201C, etc., of a desired electronic device 101A-101N for thermal data acquisition, etc. Further, at act 401B, based on the user preferences received, the method activates operational states of the electronic devices 101A-101N for sensing the thermal data. The operational states involve activating a measurement state and/or controlling a resolution, a frequency, an area, etc., for selective sensing of the thermal data. At act 401C, the method receives the thermal data sensed by the thermal sensing units $101A_1$-$101N_1$ of the electronic devices 101A-101N and stores the thermal data in the thermal management database 102E shown in FIG. 1.

At act 402, the method generates a thermal profile 203 based on the thermal data obtained. At act 402A, the method receives a user preference regarding the thermal profile 203 to be generated. The user preference includes a temporal thermal profile having temperature contours of an electronic device 101A-101N generated over a period of time, a spatial thermal profile having temperature contours of an electronic device 101A-101N generated across a desired surface area of the electronic device 101A-101N, a combination of temporal and spatial thermal profile, or an aggregated thermal profile having thermal data recorded for a particular integrated circuitry 201A, 201B, 201C, etc., of multiple electronic devices 101A-101N. At act 402B, the method, based on the user preferences, retrieves the thermal data from the thermal management database 102E and plots a thermal profile 203.

At act 403, the method determines an abnormal thermal condition 203B associated with the electronic device 101A-101N based on the thermal profile 203. At act 403A, the method retrieves from the thermal management database 102E, reference thermal profiles for the electronic devices 101A-101N for which the thermal profiles 203 have been generated. At act 403B, the method compares the thermal profiles 203 with the reference thermal profiles and determines abnormal thermal conditions 203B existing if any, by comparing deviations found with pre-defined deviation thresholds of the electronic devices 101A-101N. At act 403C, the method analyzes the abnormal thermal conditions 203B based on one or more performance parameters including, for example, a pre-defined deviation threshold of each of the electronic devices 101A-101N, a rate of occurrence of a deviation in the thermal profile 203, and an integrated circuitry 201A, 201B, or 201C of each of the electronic devices 101A-101N with which the abnormal thermal condition 203B is associated, that is, an inherent criticality of the integrated circuitry 201A, 201B, 201C, etc. At act 403D, the method determines a risk index based on the analysis of the abnormal thermal condition. For example, if the abnormal thermal condition 203B is associated with a critical component 201A, 201B, or 201C of the electronic device 101A-101N then the risk index is determined to be high.

At act 404, the method determines a preventive action to be performed on at least one of the electronic devices 101A-101N so as to address the abnormal thermal condition, that is, to restrict the abnormal condition 203B from further escalation and converting the abnormal thermal condition 203B to a normal thermal condition which is same as the reference thermal profile. The method determines the preventive action based on historical data stored in the thermal management database 102E corresponding to the risk index. At act 405, the method initiates a preventive action at the electronic device 101A-101N. The preventive action may include invoking a cleaning routine, replacing the integrated circuitry 201A, 201B, 201C, etc., generating a notification, etc.

Where databases are described such as the thermal management database 102E, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The foregoing examples have been provided merely for the purpose of explanation and are in no way to be construed as limiting of the present disclosure disclosed herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the disclosure in its aspects.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A thermal management device comprising:
   a non-transitory computer readable storage medium configured to store one or more modules comprising computer program instructions;
   at least one processor communicatively coupled to the non-transitory computer readable storage medium, the at least one processor configured to execute the computer program instructions;
   a thermal data management module configured to obtain thermal data associated with an electronic device communicatively couplable with the thermal management device, wherein the electronic device comprises at least one thermal sensing unit, and wherein the thermal sensing unit is configured to sense the thermal data associated with the electronic device;
   a thermal profile generation module configured to generate a thermal profile based on the thermal data;
   a thermal data analysis module configured to determine an abnormal thermal condition associated with the electronic device based on the thermal profile and determine a risk index based on an analysis of the abnormal thermal condition; and
   a thermal conditioning module configured to: determine a preventive action to be performed on the electronic device such that the abnormal thermal condition is addressed, wherein the preventive action is determined based on historical data corresponding to the determined risk index; and initiate the preventive action at the electronic device.

2. The thermal management device of claim 1, wherein the thermal data management module is further configured to activate the thermal sensing unit in the electronic device for selectively obtaining the thermal data.

3. The thermal management device of claim 1, wherein the thermal profile comprises at least one of a temporal profile and a spatial profile of the thermal data associated with the electronic device.

4. The thermal management device of claim 3, wherein the thermal profile further comprises an aggregated profile of the thermal data associated with an integrated circuitry of one or more electronic devices.

5. The thermal management device of claim 1, wherein the thermal profile comprises an aggregated profile of the thermal data associated with an integrated circuitry of one or more electronic devices.

6. The thermal management device of claim 1, wherein the thermal data analysis module is further configured to:
   obtain a reference thermal profile associated with one or more electronic devices;
   compare the thermal profile and the reference thermal profile; and
   determine the abnormal thermal condition based on the comparison of the thermal profile and the reference thermal profile using a pre-defined deviation threshold of each electronic device of the one or more electronic devices.

7. The thermal management device of claim 6, wherein the thermal data analysis module is further configured to:
   analyze the abnormal thermal condition based on one or more performance parameters,
   wherein the one or more performance parameters comprise the pre-defined deviation threshold of each electronic device of the one or more electronic devices, a rate of occurrence of a deviation in the thermal profile, and one or more properties of an integrated circuitry of each electronic device of the one or more electronic devices with which the abnormal thermal condition is associated.

8. The thermal management device of claim 1, wherein the thermal data analysis module is further configured to:
   analyze the abnormal thermal condition based on one or more performance parameters,
   wherein the one or more performance parameters comprise a pre-defined deviation threshold of each electronic device of one or more electronic devices, a rate of occurrence of a deviation in the thermal profile, and one or more properties of an integrated circuitry of each electronic device of the one or more electronic devices with which the abnormal thermal condition is associated.

9. A thermal management system comprising:
   an electronic device comprising integrated circuitry and a thermal sensing unit configured to sense thermal data associated with the electronic device, wherein the thermal sensing unit comprises a plurality of thermal sensors operably connected with the integrated circuitry; and
   a thermal management device communicatively couplable with the electronic device, wherein the thermal management device comprises:

a non-transitory computer readable storage medium configured to store one or more modules comprising computer program instructions;

at least one processor communicatively coupled to the non-transitory computer readable storage medium, the at least one processor configured to execute the computer program instructions;

a thermal data management module configured to obtain thermal data associated with the electronic device;

a thermal profile generation module configured to generate a thermal profile based on the thermal data;

a thermal data analysis module configured to: determine an abnormal thermal condition associated with the electronic device based on the thermal profile and determine a risk index based on an analysis of the abnormal thermal condition; and a thermal conditioning module configured to: determine a preventive action to be performed on the electronic device such that the abnormal thermal condition is addressed, wherein the preventive action is determined based on historical data corresponding to the determined risk index; and initiate the preventive action at the electronic device.

10. A method for managing thermal data associated with one or more electronic devices, the method employing a thermal management device communicatively couplable with the one or more electronic devices, the method comprising:

obtaining thermal data associated with an electronic device of the one or more electronic devices;

generating a thermal profile based on the thermal data;

determining an abnormal thermal condition associated with the electronic device of the one or more electronic devices based on the thermal profile;

determining a risk index based on an analysis of the abnormal thermal condition;

determining a preventive action to be performed on at least one electronic device of the one or more electronic devices, such that the abnormal thermal condition is addressed, wherein the preventive action is determined based on historical data corresponding to the determined risk index; and initiating the preventive action at the at least one electronic device of the one or more electronic devices.

11. The method of claim 10, wherein the obtaining of thermal data comprises selectively activating a thermal sensing unit in the electronic device of the one or more electronic devices for sensing the thermal data.

12. The method of claim 10, wherein the determining of the abnormal thermal condition comprises:

obtaining a reference thermal profile associated with the one or more electronic devices;

comparing the thermal profile and the reference thermal profile; and determining the abnormal thermal condition based on the comparing of the thermal profile and the reference thermal profile using a pre-defined deviation threshold of each electronic device of the one or more electronic devices.

13. The method of claim 12, further comprising:

analyzing the abnormal thermal condition based on one or more performance parameters, wherein the one or more performance parameters comprise the pre-defined deviation threshold of each electronic device of the one or more electronic devices, a rate of occurrence of a deviation in the thermal profile, and one or more properties of an integrated circuitry of each electronic device of the one or more electronic devices with which the abnormal thermal condition is associated; and determining the risk index based on the analysis of the abnormal thermal condition.

* * * * *